July 19, 1932. O. S. CLOUD 1,868,347
LAWN MOWER
Filed Sept. 15, 1931 3 Sheets-Sheet 1

Inventor
Orval S. Cloud

By Clarence A. O'Brien
Attorney

July 19, 1932.  O. S. CLOUD  1,868,347
LAWN MOWER
Filed Sept. 15, 1931    3 Sheets-Sheet 3
Fig. 3.
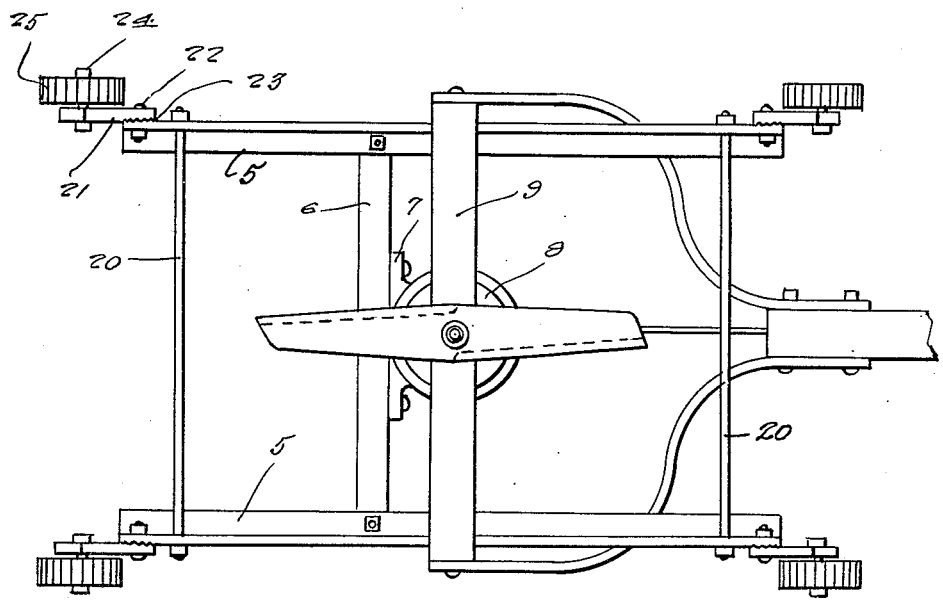
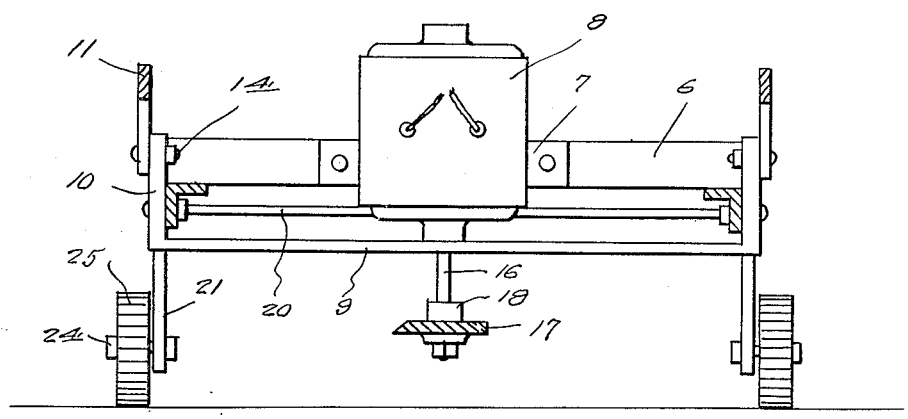
Fig. 4.
Inventor
Orval S. Cloud
By Clarence A. O'Brien
Attorney Patented July 19, 1932

1,868,347

UNITED STATES PATENT OFFICE

ORVAL S. CLOUD, OF KEMBLESVILLE, PENNSYLVANIA

LAWN MOWER

Application filed September 15, 1931. Serial No. 562,970.

The present invention relates to a lawn mower or a machine for cutting grass and the like and has for its prime object to provide a machine of this nature particularly well adapted for cutting relatively long grass or the like and embodying an adjustable feature to insure efficiency in cutting the grass depending upon the height thereof.

A still further very important object of the invention resides in the provision of a machine of this nature which is simple in its construction, easy to manipulate, thoroughly reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is a bottom plan view thereof.

Figure 4 is a vertical transverse section therethrough taken substantially on the line 4—4 of Figure 1.

Figure 5 is a perspective view of a cross member, and

Figure 6 is a perspective view of the cutting element.

Figure 1:
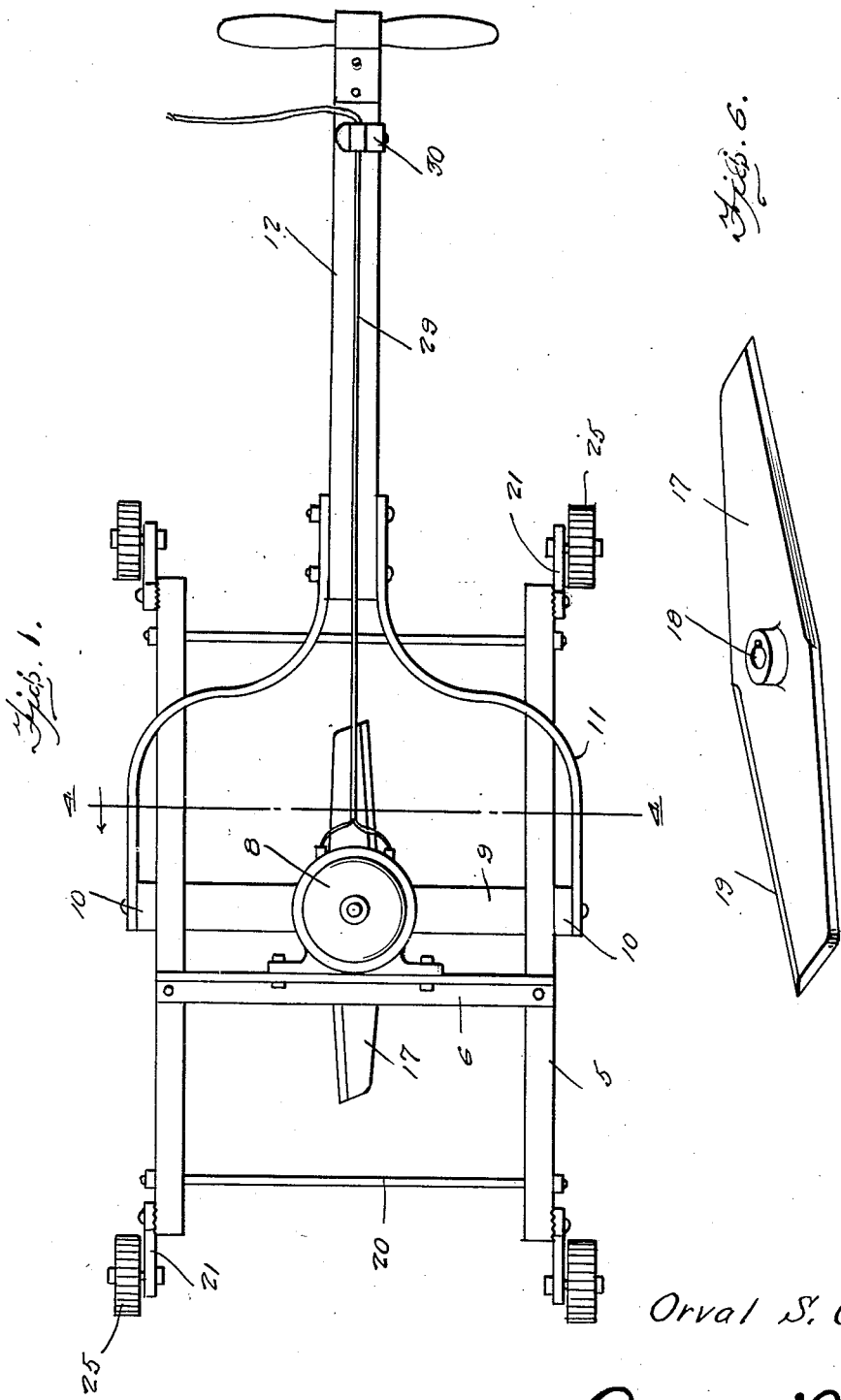
Figure 1 is a top plan view of a machine embodying the features of my invention.
Figure 2:
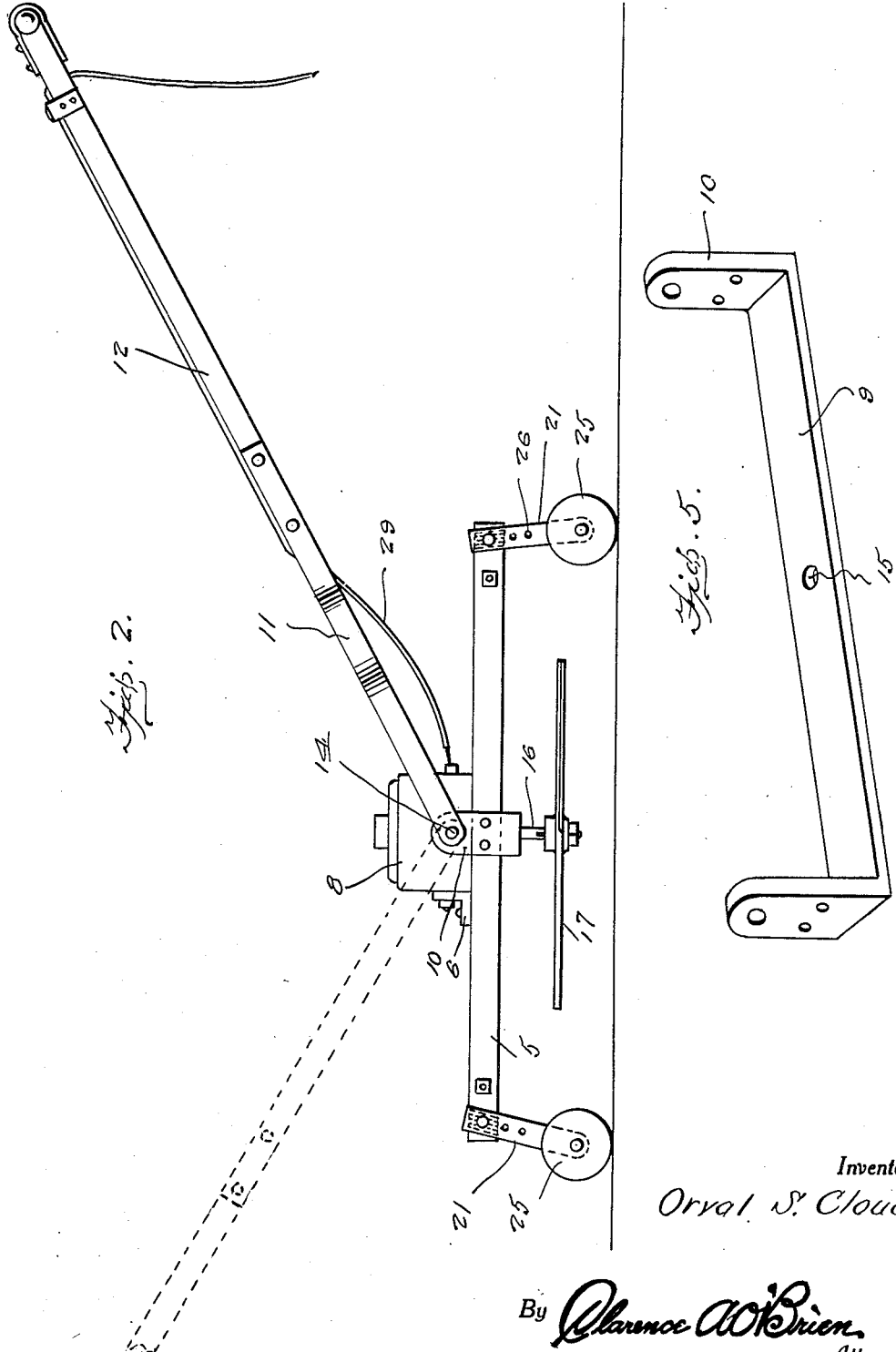
Figure 2 is a side elevation thereof.

Referring to the drawings in detail it will be seen that numerals 5 denote a pair of spaced parallel coextensive side bars preferably in the from of angle iron. Numeral 6 denotes a cross bar fixed on the side bars 5 and having a bracket 7 intermediate its ends for holding an electric motor 8.

Numeral 9 denotes a cross bar having upstanding ends 10 intermediate portions of which are secured to the centers of the side bars 5. Yoke members 11 extending from a handle 12 have their ends pivoted as at 14 to the upper portions of the ends 10. The center of the cross member 9 is provided with an opening 15 and armature shaft 16 of the electric motor is journalled theerthrough.

On the lower end of this shaft 16 is fixed a cutting element in the form of an elongated blade 17 the center of which has a hub 18 keyed to the shaft 16. The blade portions extending from the hub each have a side cutting edge 19. The cutting edges 19 are on opposite sides of the blade. Brace rods 20 extend between end portions of the side frame bars 5.

Legs 21 are bolted as at 22 to the end portions of the frame side bars 5 and teeth 23 are provided on the legs and the side bars to engage each other to prevent swinging of the legs when the bolts are tightened. Axles 24 extend outwardly from the lower ends of the legs and have wheels 25 journalled thereon. The legs are provided with pluralities of openings 26 for the bolts 22 for the purpose of adjusting the height of the frame from the ground and thereby adjust the height of the cutting element.

The legs may also be swung inwardly or outwardly and tightened in adjusted position for more minute adjustment.

From the above detailed description it will be seen that the blade is adapted to rotate in a plane substantially parallel to the ground on which the rollers 25 move. In this way relatively tall grass may be efficiently mowed down. An electric extension cord 29 is extended from the mower and through a bracket 30 on the handle 12 and may be attached to a suitable source of electrical energy.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A lawn mower of the class described, including, in combination, a frame comprising a pair of spaced parallel coextensive side bars, roller means for supporting said frame, an electric motor, means for mounting the motor upon said frame between the side bars thereof with its armature shaft extending downwardly from the frame and perpendicularly thereto, a cutting element on the armature shaft below the frame, a cross member under the frame having integral upstanding ends the intermediate portions of which are fixed to the side bars, yoke members pivoted to the upper portions of the upstanding ends and a handle extending from the yoke members, said cross member having an opening in which said armature shaft is journalled.

2. A lawn mower of the class described, including, in combination, a frame comprising a pair of spaced parallel coextensive side bars, roller means for supporting said frame, an electric motor upon said frame, means for mounting the motor between the side bars thereof, with its armature shaft extending downwardly from the frame and perpendicularly thereto, a cutting element on the armature shaft below the frame, a cross member under the frame having integral upstanding ends the intermediate portions of which are fixed to the side bars, yoke members pivoted to the upper portions of the upstanding ends and a handle extending from the yoke members, said cross member having an opening in which said armature shaft is journalled, said roller supporting means comprising a plurality of rollers rotatably mounted on a plurality of legs, means for adjustably engaging the legs with the ends of the side bars.

In testimony whereof I affix my signature.

ORVAL S. CLOUD.